UNITED STATES PATENT OFFICE.

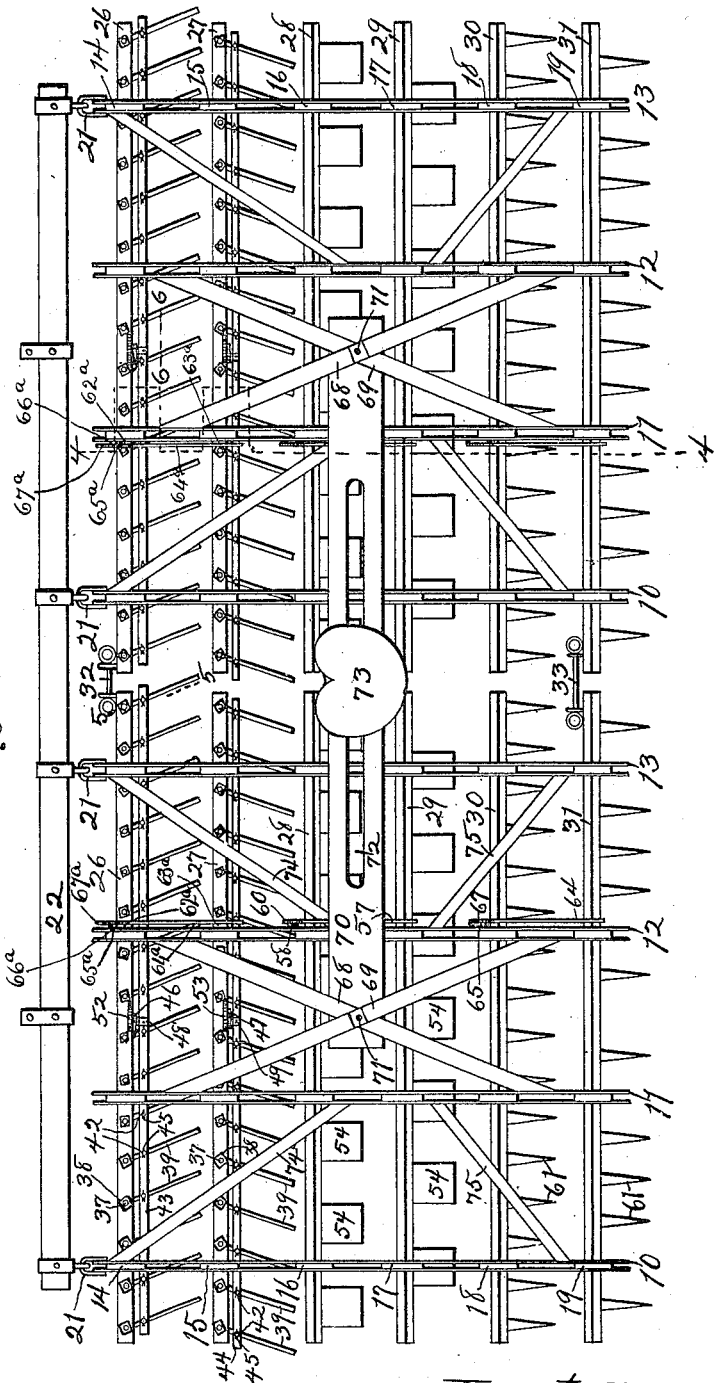

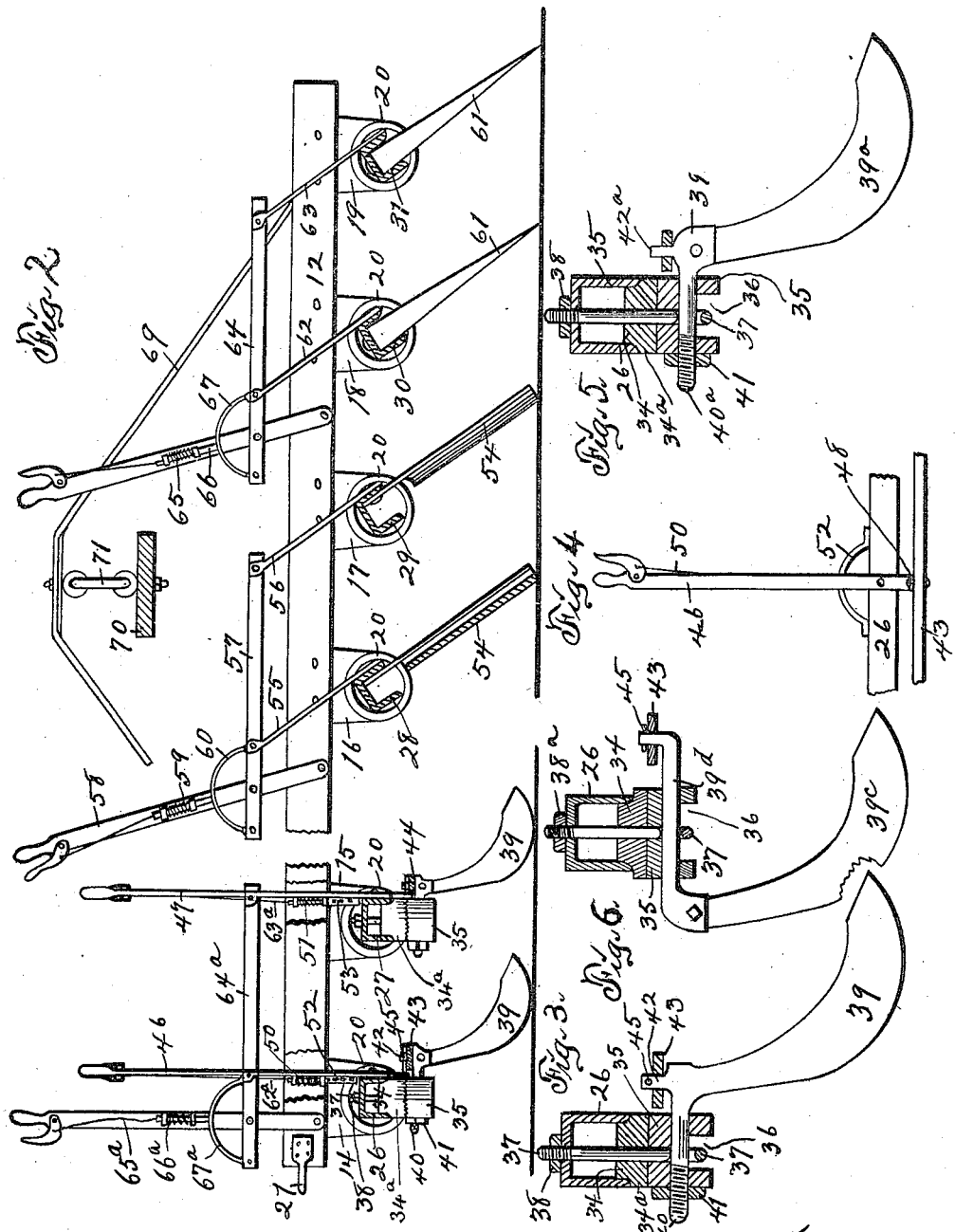

THERIDES V. BARNARD, OF SCHALLER, IOWA.

SOIL PULVERIZER AND LEVELER.

985,497.  Specification of Letters Patent.  Patented Feb. 28, 1911.

Application filed March 24, 1910. Serial No. 551,367.

*To all whom it may concern:*

Be it known that I, THERIDES V. BARNARD, a citizen of the United States of America, and resident of Schaller, Sac county, Iowa, have invented a new and useful Soil Pulverizer and Leveler, of which the following is a specification.

An object of my invention is to provide an improved construction for a sod or hummock blade and means for attaching said blade to a bar.

A further object of my invention is to provide improved means for connecting a series of sod or hummock blades for conjunctive oscillation.

My invention consists in the construction, arrangement and combination of elements hereinafter set forth, pointed out in my claims and illustrated by the accompanying drawing, in which—

Figure 1 is a plan showing my improved devices applied to the construction of a two-section apparatus and embodying all such improvements. Fig. 2 is a section on the line 4—4 of Fig. 1. Fig. 3 is a detail vertical section on the indicated line 5—5 of Fig. 1, on an enlarged scale. Fig. 4 is an elevation, on the indicated line 6—6 of Fig. 1, on an enlarged scale. Fig. 5 illustrates a modified construction for the sod and hummock blade and means for mounting the same embodied in the apparatus. Fig. 6 illustrates a further modified form of sod and hummock blade and means for mounting the same.

The machine, implement or apparatus may be constructed in unitary form, or of any desired multiples of such units, and to show such construction clearly and avoid confusion I have illustrated the use of two units conjunctively and hinged together.

In the construction of a single section or unit of the implement or apparatus the numerals 10, 11, 12, 13 designate longitudinal sills arranged parallel with each other and spaced apart. Each of the sills 10, 11, 12, 13 is composed of parallel bars spaced apart by and rigidly secured to brackets 14, 15, 16, 17, 18, 19, said brackets being spaced apart throughout the length of the sill. The brackets project downward from the sill and are formed with sleeves or annular bearings 20 transversely thereof and transversely of and below the sill. A clevis 21 is fixed to the forward end of each sill 10, 13 and said clevises are adapted to be secured to draft devices such as a cross bar 22. Channel bars, or U-bars, 26, 27, 28, 29, 30, 31 are mounted loosely in and extend through the sleeves 20 of the brackets 14, 15, 16, 17, 18, 19 respectively. The bar 26 forms the foremost margin of the unit of the implement and the bar 31 forms the rearmost margin of said unit, the remaining bars 27, 28, 29, 30 being disposed in parallel relations with and between the foremost and rearmost bars. When two or more of the units are used conjunctively as shown the channel bars of one unit are in alinement with the channel bars of the adjacent unit, the foremost bars 26 of the units are connected pivotally by a link 32 and the rearmost bars 31 of the units are connected pivotally by a link 33. A series of sockets 34 are formed with square shanks mounted in and fitting transversely of the channel bars 26, 27 and said sockets are spaced apart throughout the lengths of said bars. Each of the sockets 34 is formed with a circular head 34$^a$ on its lower end outside of the channel bar carrying the socket and each head is serrated or roughened on its lower face. A bearing 35 (Fig. 5) is mounted beneath the lower end of each socket 34. The upper face of the bearing 35 is serrated or roughened and matches and frictionally engages with the roughened lower face of the head 34$^a$ of the socket. The bearing 35 is formed with a recess 36 adapted to receive the head of an eye-bolt 37, said eye-bolt extending vertically through a central bore in the stem of said bearing and also extending through an aperture formed in the body of the channel bar 26 or 27. The eye-bolt is secured by a nut 38 on its upper end engaging the channel bar 26 or 27. Torsional adjustment of the bearing 35 on the socket 34 may be effected by loosening the nut 38 on the eye-bolt 37 sufficiently to disengage roughened adjacent faces of the head 34$^a$ and bearing 35 and when such adjustment is effected a rigid relation between the parts may be established and maintained by tightening said nut and thereby reëngaging said roughened faces.

Sod or hummock blades 39 are provided and correspond in number to the sockets 34, bearings 35 and eye-bolts 37. Each of the sod and hummock blades 39 preferably is of simitar form and is sharpened or edged on its convex margin. Each of the blades 39 is provided with a stem 40 on its upper end and substantially at right angles thereto, which stem preferably is arranged horizontally and extends through and pivots in the bearing and the head of the eye-bolt and is secured against longitudinal movement therein by a nut 41 on its forward end. Thus the various sod and hummock blades 39, arranged in series throughout the lengths of the bars 26, 27, are susceptible of oscillatory adjustment on a vertical axis by adjustment of the bearings as described; and also are susceptible of oscillatory adjustment on horizontal axes through the pivotal connection of the stems 40 with the bearings. The former adjustment is effected by individual manipulation of the nuts 38 and bearings; but the latter adjustment is effected conjunctively, as to each bar 26 or 27, as follows: Each of the sod and hummock blades 39 is formed with a stud 42 on its upper end and extending vertically therefrom a rod 43 is provided with a series of holes adapted to embrace loosely all of the studs 42 of the blades 39 which are carried by the bar 26; and a rod 44 of like character engages loosely all of the studs of the blades 39 which are carried by the bar 27. The rods 43, 44 are held in place on the studs 42 by spring keys 45 mounted through said studs above the rods. Levers 46, 47 (particularly see Fig. 4) are fulcrumed on the bars 26, 27 and are connected to the rods 43, 44 respectively by links 48, 49 in such manner that any oscillation of either of said levers longitudinally of said bars will effect a rectilinear reciprocation of the corresponding rod and an oscillation of all the blades 39 engaged by said rod, which oscillate on horizontal axes through the stems 40. Detent devices 50, 51 of common form connect the levers 46, 47 detachably to segments 52, 53 on the bars 26, 27 Fig. 4. Pulverizing blades 54 are fixed to and depend from the channel bars 28, 29 and are spaced apart throughout the lengths of said bars.

Arms 55, 56 are fixed to and extend upward from the channel bars 28, 29 and are pivotally connected at their upper ends by a rod 57. A lever 58 is fulcrumed at its lower end on the sill 12 and is pivotally connected to one end portion of the rod 57. The lever 58 is arranged for oscillation longitudinally of the sill 12 and detent devices 59 connect said lever to a segment 60 on the rod 57 and are adapted to hold the lever and rod, as well as the arms 55, 56, channel bars 28, 29 and blades 54 in any position in which they may be placed manually.

Harrow teeth 61 are fixed to and depend from the channel bars 30, 31 and are spaced apart throughout the lengths of said bars. Arms 62, 63 are fixed to and extend upwardly from the channel bars 30, 31 and are pivotally connected at their upper ends to a rod 64. A lever 65 is fulcrumed at its lower end on the sill 12 and is pivotally connected to one end portion of the rod 64. The lever 65 is adapted for manual actuation longitudinally of the sill 12 and detent devices 66 are adapted to connect said lever to a segment 67 on the rod 64 and hold said lever and rod, as well as the arms 62, 63, channel bars 30, 31 and harrow teeth 61, in any position in which they may be placed by manual actuation.

Through the medium of the levers 46, 47 the lateral inclination of the sod and hummock blades 39 is adjusted and such adjustment necessarily raises or lowers the bars 26, 27 and forward ends of the sills relative to the surface of the soil. It is the function of the blades 39 to cut, split and sever sods, large clods and hummocks in the path of travel of the implement. Hence torsional adjustment of the blades 39, as above described, into the positions shown in Fig. 1 (the blades of the bars 26 inclined at an angle to the blades of the bars 27) provides means for breaking apart, rolling and moving obliquely (in both directions laterally from the path of travel) the sods, clods and hummocks, such movement being first in one direction and then in another. The torsional adjustment mentioned also has the tendency to move the forward end of the implement laterally first in one direction and then in another, resulting in an agitation of or stirring effect on the sods, clods or hummocks.

Crossed rods 68, 69 are fixed at their ends to and bracingly connect the sills 11, 12 and said rods arch upward at their centers and cross each other at an elevation relative to the horizontal planes of said sills. When two of the units of the implement are connected as shown, the crossed rods 68, 69 of adjacent units support end portions of a beam 70 by means of hangers 71, and said beam extends across from one unit to the other. The beam 70 is formed with a longitudinal slot 72 in its central portion and a seat 73 is arranged for longitudinal movement in said slot and projects above said beam. The operator occupies the seat 73 and shifts the same longitudinally of the beam as desired to bring him within reach of the levers on one unit or another and to shift his weight to one or another portion of either unit as may be indicated by the condition of the soil approached by the implement. Braces 74, 75 connect end portions of the sill 10 to central portions of the sill 11 of the respective units and other similar braces connect end portions of the sill 13 to central portions of the sill 12 of the units.

In Fig. 5 I have illustrated the sod or hummock blade 39ª separately formed and rigidly connected to a head 39ᵇ, which head preferably is formed by molding and is provided with an integral stem 40ª and the stud 42ª at right angles to each other. The stem 40ª and stud 42ª perform the same functions in this construction as the stem 40 and stud 42 previously described. The illustration of Fig. 5 is submitted out of abundant precaution to show the possibility of constructing the blade 39 of one kind of metal and securing it to the head constructed of another kind of metal. For instance, the head with its stem and stud may be made of malleable iron and the blade may be made of steel either forged, pressed or molded.

It is to be understood that more than two units of the device may be employed and may be arranged end to end or trailing relative to each other as desired. It also is to be understood that the blades 39 may be adjusted to any desired angle or arranged to trail in the path of travel of the implement.

In Fig. 6 I have illustrated the sod or hummock blade 39ᶜ separately formed and fixed to a head 39ᵈ which extends across the plane of the simitar shaped blade and is turned upward at its extremity for engagement with a rod 43. The horizontal portion of the head 39ᵈ is arranged in a bearing 35 identical with that shown in Figs. 3 and 5. This construction is similar to that shown in Fig. 5 but differs particularly in the relative positions of the head and blade.

The channel bars 26, 27 also are provided with arms 62ª, 63ª fixed to and extending upwardly therefrom and pivotally connected at their upper ends by a rod 64ª. A lever 65ª is fulcrumed at its lower end on the sill 12 and is pivotally connected to one end portion of the rod 64ª. The lever 65ª is adapted for manual actuation longitudinally of the sill 12 and detent devices 66ª are adapted to connect said lever to a segment 67ª on the rod 64ª and hold said lever and rod, as well as the arms 62ª, 63ª, channel bars 26, 27 and hummock blades 39 in which they may be placed by manual actuation.

I claim as my invention—

1. In a soil pulverizer and leveler, the combination of a frame, a bar arranged transversely of said frame, sockets mounted in said bar, and sod and hummock blades of simitar form connected to said sockets and arranged for oscillatory adjustment on vertical axes and arranged for oscillation on horizontal axes.

2. In a soil pulverizer and leveler, a transverse bar, sockets mounted therein, bearings mounted on said sockets and arranged for oscillatory adjustment on vertical axes, simitar blades pivoted in said bearings and provided with studs, a rod loosely engaging said studs, and a lever fulcrumed on said bar and flexibly connected to said rod.

3. In a soil pulverizer and leveler, a transverse bar, sockets mounted therein, bearings mounted on said sockets and arranged for oscillatory adjustment on vertical axes, said sockets and bearings formed with adjacent serrated faces, a binding bolt connecting said bearings and sockets, simitar blades pivoted in said bearings and provided with studs, a rod loosely engaging said studs, and a lever fulcrumed on said bar and flexibly connected to said rod.

4. In a soil pulverizer and leveler, a sod and hummock blade of simitar shape formed with a stem at one end and a lug at right angles to said stem.

5. In a soil pulverizer and leveler, longitudinal sills, bars crossing, pivoted to and carrying said sills, and soil treating implements carried by said bars, the soil treating implements on one or more of said bars comprising simitar blades arranged for oscillation on horizontal axes and also arranged for oscillation on vertical axes relative to said bars.

6. In a machine of the class described, parallel sills, parallel bars crossing and supporting said sills, and soil treating implements engaging and supporting said bars, the soil treating implements on one or more of said bars comprising simitar blades trailing from said parallel bars, said simitar blades adapted for adjustment on vertical axes, the blades on one bar set angularly relative to the blades on another bar, whereby the forward end portion of the machine is oscillated laterally.

Signed by me at Schaller, Iowa, this 21st day of March, 1910.

THERIDES V. BARNARD.

Witnesses:
A. J. MARTIN,
C. WILL BRIMHALL.

Copies of this patent may be obtained for five cents each, by addressing the "Commissioner of Patents, Washington, D. C."